US008746724B2

(12) United States Patent
Arends

(10) Patent No.: US 8,746,724 B2
(45) Date of Patent: Jun. 10, 2014

(54) ADAPTABLE TRAILER HITCH AND MOUNTING SYSTEM

(76) Inventor: Wayne Arends, Aplington, IA (US)

( * ) Notice: Subject to any disclaimer, the term of this patent is extended or adjusted under 35 U.S.C. 154(b) by 118 days.

(21) Appl. No.: 13/445,415

(22) Filed: Apr. 12, 2012

(65) Prior Publication Data

US 2012/0261904 A1 Oct. 18, 2012

Related U.S. Application Data

(60) Provisional application No. 61/474,333, filed on Apr. 12, 2011.

(51) Int. Cl.
*B60D 1/14* (2006.01)

(52) U.S. Cl.
USPC .......................................... 280/477; 280/511

(58) Field of Classification Search
USPC .................................................. 280/477, 511
See application file for complete search history.

(56) References Cited

U.S. PATENT DOCUMENTS

| | | | | |
|---|---|---|---|---|
| 4,183,548 | A * | 1/1980 | Schneckloth | 280/433 |
| 6,089,590 | A * | 7/2000 | Bowers | 280/477 |
| 6,179,318 | B1 * | 1/2001 | Howard | 280/477 |
| 7,731,217 | B2 * | 6/2010 | Stutts | 280/477 |

OTHER PUBLICATIONS

B&W; B&W Defender Gooseneck Coupler; Item No. N14-3411; http://tweetys.com/band-w-defender-locking-gooseneck-coupler.aspx; p. 1; Apr. 7, 2012.

* cited by examiner

*Primary Examiner* — Kevin Hurley
(74) *Attorney, Agent, or Firm* — Zarley Law Firm, P.L.C.

(57) ABSTRACT

A trailer and hitch mounting system that includes a hitch insert assembly that is attached to a hitch attachment of a trailer and additionally has a hitch mount. A mounting plate assembly has a mounting plate that is secured to the bed of a truck and has a frustoconically shaped hitch guide with an angled surface that receives and is engaged by the hitch mount in order to guide the hitch mount toward an opening within the hitch guide to place the hitch mount at a predetermined location for securing the trailer to a truck.

13 Claims, 4 Drawing Sheets

12
16
24
26
28
30
32
34
36
38
40
50
54
56
58
62
64
66
68
70
72
74
76
78
90
92
94
96
98
100
102

ADAPTABLE TRAILER HITCH AND MOUNTING SYSTEM

CROSS REFERENCE TO RELATED APPLICATION

This application claims the benefit of U.S. Provisional Application No. 61/474,333 filed Apr. 12, 2011.

BACKGROUND OF THE INVENTION

This invention is directed toward a trailer hitch and hitch mounting system. More specifically, and without limitation, this invention relates to an adaptable and improved trailer hitch and mounting system incorporated into a standard trailer and truck.

Various types of trailers are known and utilized for hauling a wide variety of items due to their ability to haul loads which are too large in either volume or size to be accommodated by a truck. Many types of trailers, including those commonly referred to as having a "gooseneck", are characterized by a raised mounting structure designed to be mounted to a mounting structure with a ball hitch installed into the bed of a truck.

Although the present mounting structure adequately provides a secure connection between the trailer and the truck, successfully mounting the trailer to the truck's mounting structure and ball hitch is often difficult, time consuming, and frustrating. Specifically, the current gooseneck hitch system consists of a standard two foot tube that inserts into the trailer with an attached locking mechanism to lock the trailer into place on a typical ball hitch mounted to the bed of a truck. Given that standard sized ball hitches commonly have a diameter no larger than two and a half inches, the present system requires that the hitch tube of the trailer and the ball hitch of the truck are precisely aligned with very little margin for error to ensure that ball hitch is received within the trailer hitch once the trailer is lowered onto the mounting structure. Thus, achieving a proper mounting alignment often requires repeatedly re-positioning the truck to achieve alignment with the trailer or a second person outside of the vehicle acting as a spotter to provide the operator of the truck with directions.

Furthermore, currently known mounting systems as described above require a ball hitch to be installed protruding upward from the bed of the truck, with many additionally requiring further structural components such as supporting plates and rails to be installed into the bed of the truck to provide sufficient structural support for the ball hitch and associated locking mechanisms. Thus, currently known systems not only are characterized by difficulties in mounting the trailer to the truck's mounting structure and ball hitch, but also compromise the utility of the truck itself by requiring a ball hitch and associated mounting structure to occupy and interfere with the bed space of the truck. As a result, there exists a need in the art that addresses these problems.

Therefore a primary object of this invention is to provide an adaptable and improved trailer hitch and mounting system that provides an automatic, quick, and easy mounting connection between the trailer and the truck.

It is yet another object of this invention to provide an adaptable and improved trailer hitch and mounting system that automatically guides the trailer hitch into a mounting connection with the truck.

It is a further object of this invention to provide an adaptable and improved trailer hitch and mounting system that is sized to be used with and incorporated into a standard trailer.

These and other objects, features or advantages of the present invention will become apparent from the specification and claims.

BRIEF SUMMARY OF THE INVENTION

A trailer hitch and mounting system and a method of securing a trailer to a truck utilizing the same. The system includes a hitch insert assembly that is attached to a hitch attachment of a trailer and has a hitch mount. A mounting plate assembly has a mounting plate that is secured to the bed of the truck and additionally has a hitch guide that has an angled surface that receives and is engaged by the hitch mount to guide the hitch mount toward an opening at the bottom of the hitch guide so that the hitch mount is placed in a predetermined location for securing the trailer to the truck.

DETAILED DESCRIPTION OF THE PREFERRED EMBODIMENT

Figure 1:
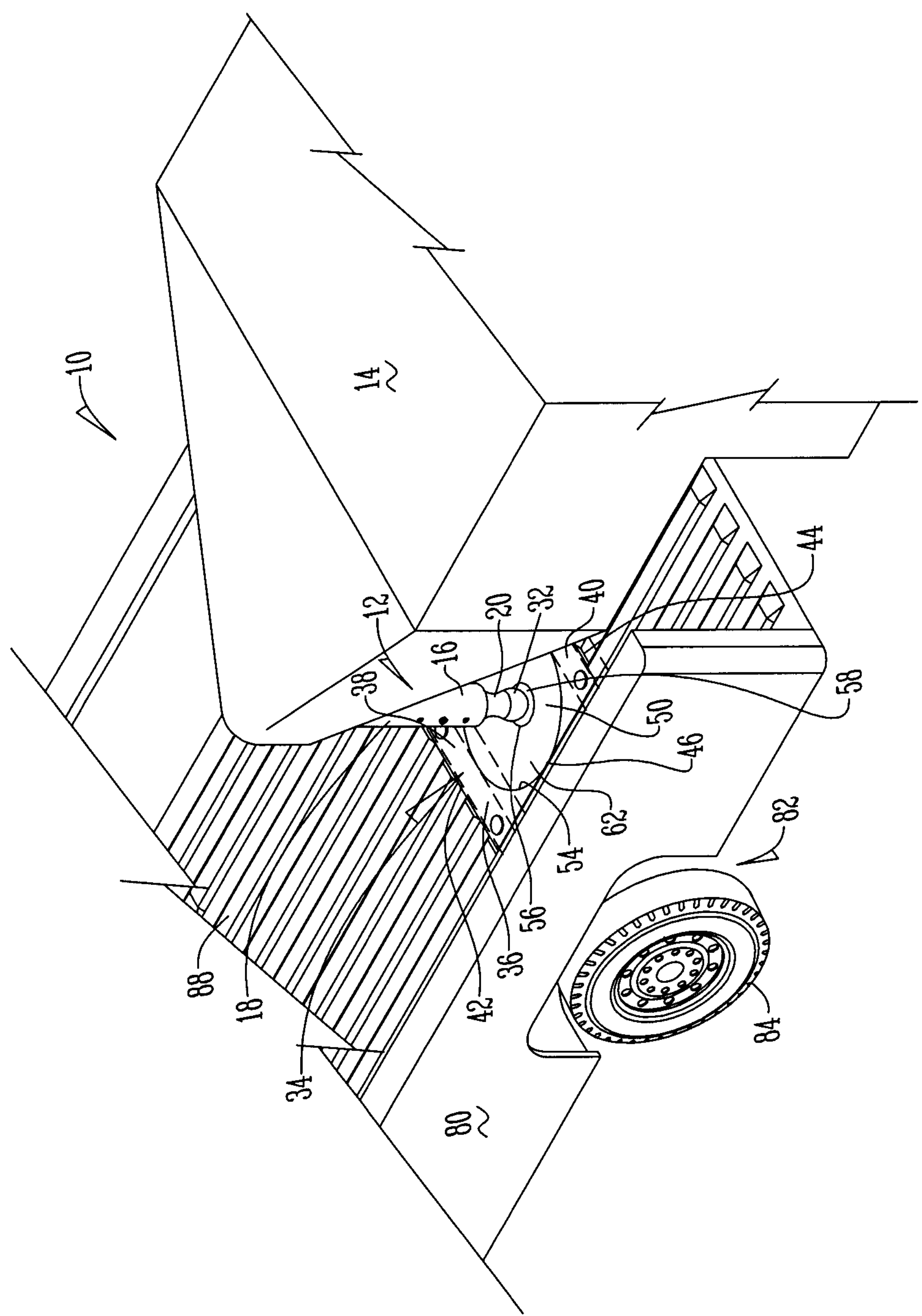
FIG. 1 is a cut-away perspective view of a trailer hitch and mounting system with a hitch insert assembly engaging an angled surface of a hitch guide of a mounting plate assembly.
Figure 2:
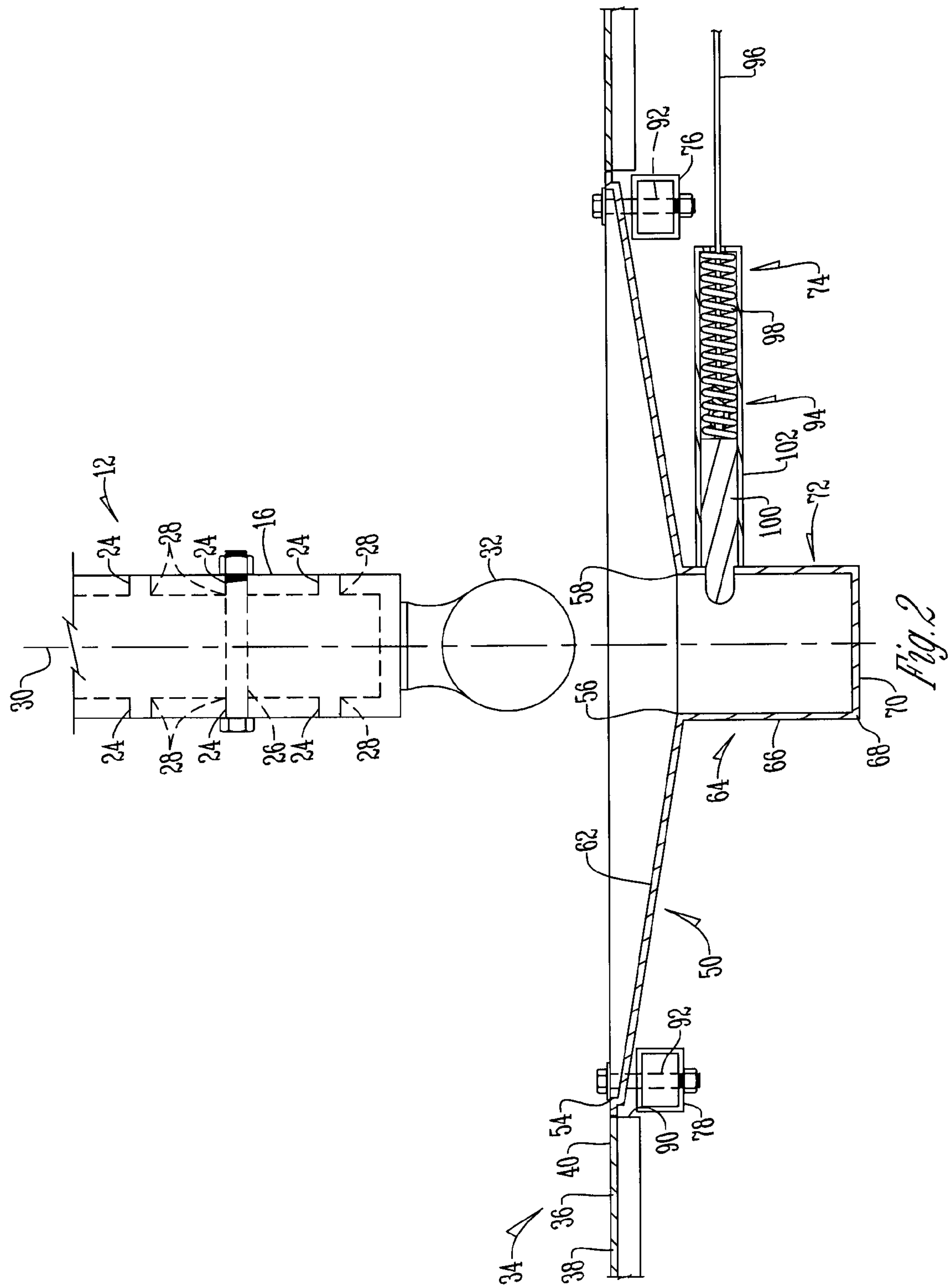
FIG. 2 is a side sectional view of a hitch insert assembly and a mounting plate assembly of a trailer hitch and mounting system.
Figure 3:
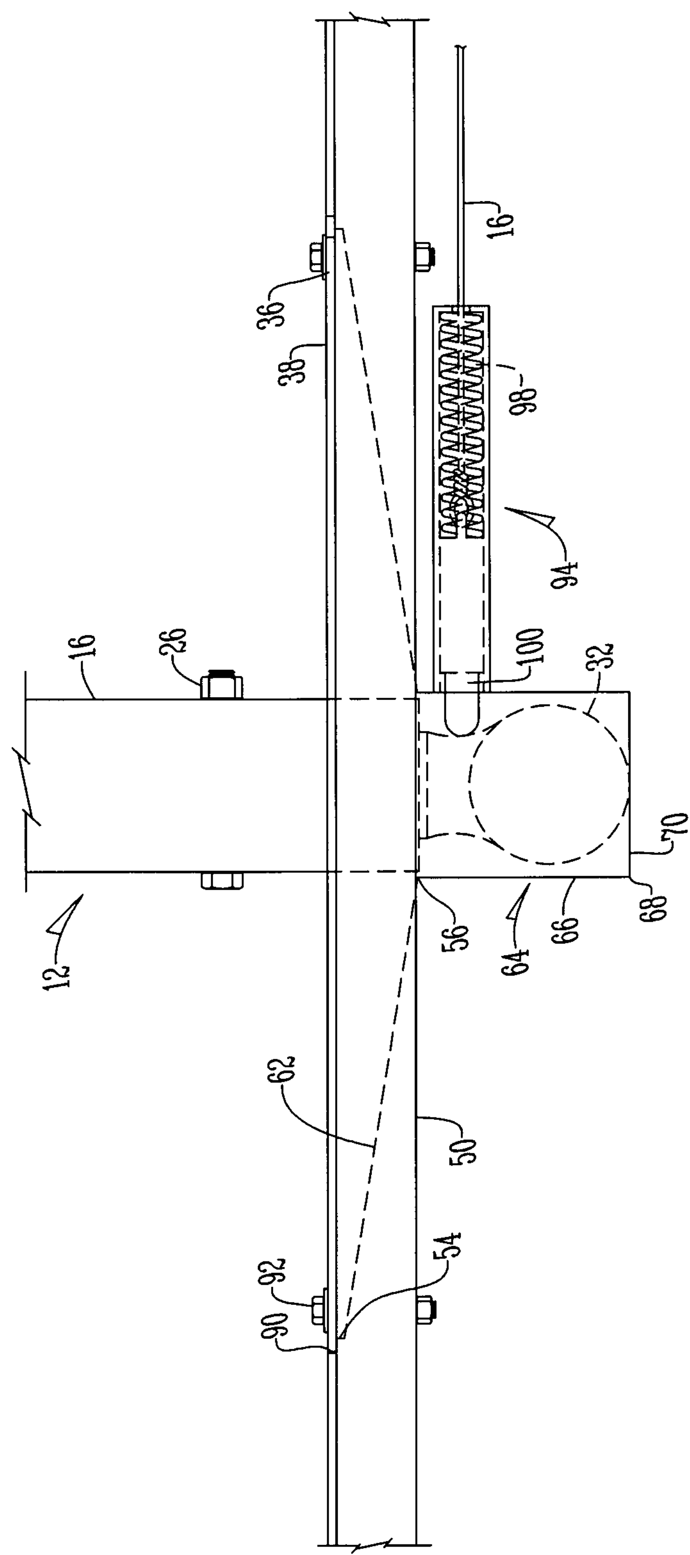
FIG. 3 is a side plan view of a hitch insert assembly disposed within a mounting plate assembly at a predetermined location.
Figure 4:
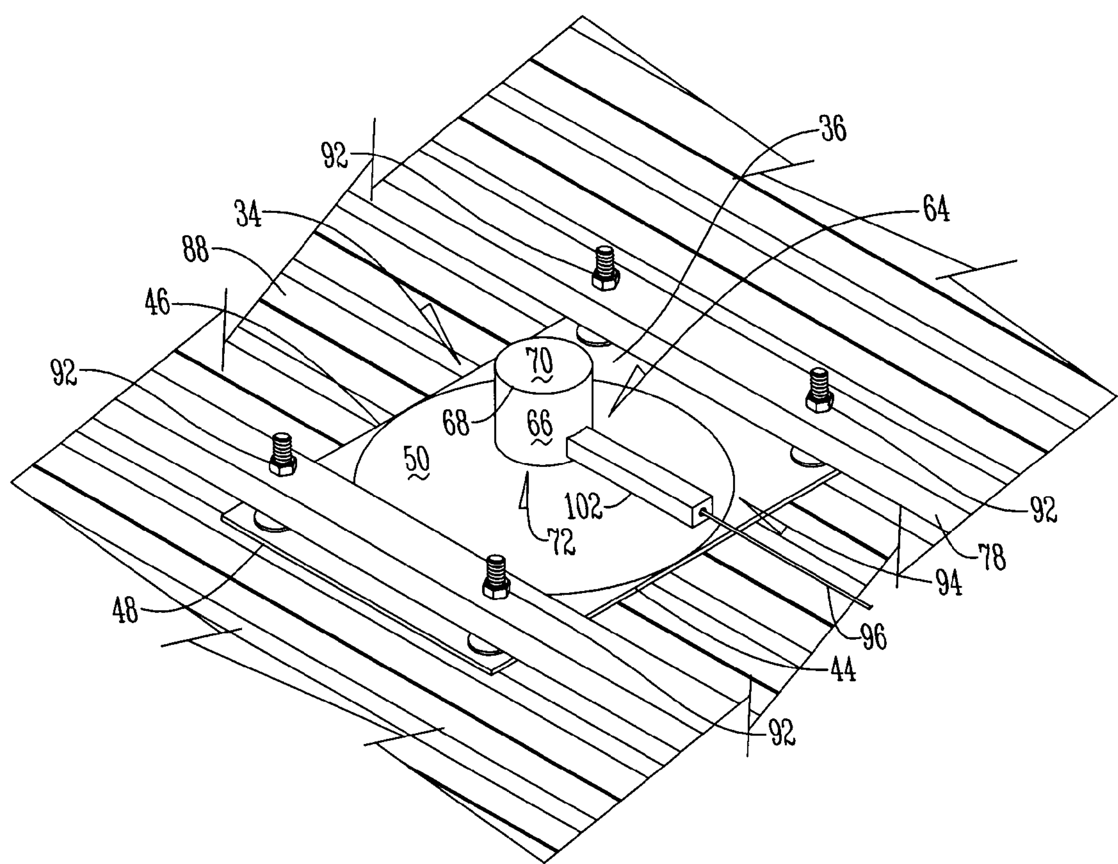
FIG. 4 is a cut-away bottom perspective view of a mounting plate assembly.

Referring to the figures, an adaptable and improved trailer hitch and mounting system 10 includes a hitch insert assembly 12 which is sized to be integrated into a standard trailer 14. The hitch insert assembly 12 includes a hitch insert 16. The hitch insert 16 is an elongated bar or hollow cylindrical tube which extends longitudinally from an upper end 18 to a lower end 20. The hitch insert 18 is of any size adequate to be secured to a standard hitch attachment 12 of a trailer 14.

Two or more insertion holes 24 extend laterally through the hitch insert 16. In one embodiment, three insertion holes 24 are provided. The insertion holes 24 are sized to receive a connection pin 26 disposed through both the insertion holes 24 and the correspondingly aligned insertion holes 28 disposed through the hitch attachment 22 of a trailer 14. The insertion holes 24 of the hitch insert 16 are positioned at pre-defined increments along the hitch insert's central vertical axis 30 such that the insertion holes 24 of the hitch insert 16 matingly align with corresponding insertion holes 28 disposed through the hitch attachment 22 of a trailer 14. Thus, the mounting height of the trailer 14 can be adjusted by telescopically extending or retracting the hitch insert 16 within the hitch attachment 22 of a trailer 14. Also included in the hitch insert assembly 12 is a hitch mount 32 affixed to the lower end 20 of the hitch insert 16. In a preferred embodiment, the hitch mount 32 is a ball mount.

A mounting plate assembly 34 is also provided as part of the mounting system 10. The mounting plate assembly 34 includes a mounting plate 36 having an outer frame 38 with a flat, planar upper surface 40 and additionally includes a front edge 42, a rear edge 44, and side edges 46 and 48. Disposed within the outer frame 38 is a hitch guide 50. The hitch guide 50 is comprised of an angled, bowl-shaped, or frustoconical cross section extending downward from the upper surface 40 of the mounting plate's outer frame 38 into the interior of the mounting plate 36 in between the outer frame 38 and the interior hitch housing. Specifically, the hitch guide 50 includes an upper edge 54 which is on the upper surface 40 of the outer frame 38 adjacent to the front 40, rear 44, and side edges 46 and 48 of the outer frame 38 and a lower or terminal edge 56 which forms an opening 58 in the center of the mounting plate 36. The hitch guide 50 further is comprised of a hitch guide surface which extends from the upper edge 54 to the lower or terminal edge 56 of the hitch guide 50 to define an angled surface 62 extending downwardly at an angle within the interior of the mounting plate to define a centrally located opening 58 within the interior of the mounting plate 36.

A hitch housing 64 is disposed within the central opening 58 of the mounting plate 36. The hitch housing 64 includes side walls 66 extending downward from the lower edge 56 of the hitch guide 50 to terminal ends 68 which are attached to a lower base plate 70 to form a cup-shaped housing 72 below the angled hitch guide 50 at the interior of the mounting plate 36 for receiving the hitch mount 32 within the interior of the hitch housing 64. In a preferred embodiment, dimensions of the side walls 66 and the base plate 70 are sized to receive a standard sized hitch mount 32 within the hitch housing 64.

A mounting assembly is also provided as part of the mounting plate assembly 34 and has first and second mounting rails 76 and 78 that extend laterally or perpendicular with respect to the front and rear of a truck 80. In a preferred embodiment the mounting rails 76 and 78 are aligned with the wheel base 82 of the rear wheels 84 of the truck 80 and are 2"×2" square beams. The first and second mounting rails 76 and 78 are mounted to a lower surface 86 of the truck bed 88 adjacent to and below an opening 90 cut into the truck bed 88 which receives the mounting plate 36. Once the mounting plate 36 is placed within the opening 90 cut into the truck bed 88, the front and rear edges of the mounting plate 36 are affixed to the first and second mounting rails 76 and 78 respectively by fasteners 92 such that the mounting plate 36 is mounted to the mounting assembly 74 flush within the bed 88 of the truck 80.

The mounting plate assembly 10 also includes a locking pin assembly 94. The locking pin assembly 94 includes an elongated handle 96, a spring 98 and a locking pin 100 within a pin housing 102. The locking pin housing 102 extends laterally into an upper portion of the hitch housing 64 offset with respect to the center vertical axis of the hitch housing 64. The locking pin housing 102 extends through a side wall of the hitch housing 64 such that the locking pin 100, when actuated by the spring 98 and the handle 96, extends through the locking pin housing 102 into the hitch housing 64. The locking pin 100 engages a tapered surface or recess of the hitch mount 32 in between the lower end of the hitch insert 16 and the upper end of the hitch mount 32 received within the hitch housing 64 to secure the hitch mount 32 housed within the hitch housing 64. The handle 96 extends outwardly from the hitch housing 64 under the mounting plate assembly 34 between the mounting rails 76 and 78 to the exterior of the truck 80 over the rear wheel 84 of the truck 80 to permit actuation by the user.

In operation, an opening is cut into the bed 88 of a truck 80 sized to accommodate and receive the mounting plate 36. The rails 76 and 78 are mounted to the underside of the truck's bed 88 and the outer frame 38 of the mounting plate 36 is placed within the opening in the truck bed 88 and affixed to the mounting assembly 74 by bolting the front and rear edges of the outer frame 38 of the mounting plate 36 to the first and second mounting rails 76 and 78 such that outer frame 38 of the mounting plate 36 is mounted to the truck flush with the truck's bed 88. Thus, the hitch guide 50 forms a depression within the truck bed 88 for receiving the hitch insert 16 therein.

The hitch insert 16 is inserted into the hitch attachment 22 of a trailer 14 by inserting the insert bar into the trailer's hitch attachment 22 such that the hitch mount 32 extends downwardly from the lower end of the hitch insert 16 and the trailer 14. After the insertion, holes of the hitch insert 16 are aligned with the insertion holes of the trailer 14. Then a connection pin is inserted through the aligned holes of the hitch insert 16 and trailer hitch to secure the hitch insert 16 to the trailer hitch.

In order to secure the trailer 14 to the truck 80 using the hitch and mounting system 10, the trailer 14 equipped as provided above is aligned with the mounting plate assembly 34 secured within the bed 88 of the truck 80 with the handle 96. Specifically, the downwardly oriented hitch mount or ball is aligned at any point above the hitch guide surface of the mounting plate 36 and the handle 96 and spring 98 of the locking pin 94 assembly are actuated to retract the locking pin 100 from the hitch housing and leave the hitch housing clear of the locking pin 100 to receive the hitch mount. As the trailer 14 and hitch insert 16 are lowered, because of the frustoconical shape of the hitch guide 50 the hitch insert is guided into the centrally located hitch housing by the downwardly angled guide surfaces of the mounting plate assembly 34. Once the hitch mount 32 has been guided into and retained within the hitch housing 64 at the center of the mounting plate 36 by the guide surface of the hitch guide 50, the handle 96 of the locking pin assembly 94 is actuated. As a result the spring 98 within the locking pin housing 102 expands to advance the locking pin 100 from the locking pin housing 102 into the interior of the hitch housing in between the hitch mount 32 and the lower end of the hitch insert bar such that the extended locking pin 100 retains the hitch mount 32 securely housed within the hitch housing 64.

Therefore, an adaptable and improved trailer hitch and mounting system 10 has been disclosed that provides an automatic, quick, and easy mounting connection between the trailer and the truck. The system 10 automatically guides the trailer hitch into a mounting connection with the truck 80 with a high margin of error. The system is sized to be used with and incorporated into a standard trailer 14 and attaches to the truck's frame mounted flush and disposed within the bed 88 of a truck 80 such that the truck bed 88 is left clear when the mounting system not in use. As a result, at the very least, the adaptable and improved trailer hitch and mounting system 10 meets all of its stated objectives.

It will be appreciated by those skilled in the art that other various modifications could be made to the device without parting from the spirit and scope of this invention. All such modifications and changes fall within the scope of the claims and are intended to be covered thereby.

What is claimed is:

1. A method of securing a trailer to a truck steps comprising:

providing a truck and a trailer in spaced relation to the truck;

engaging and moving a hitch insert assembly along an angled surface of a mounting plate assembly to guide the first coupling device to a hitch housing; and locking the hitch insert assembly in place in the hitch housing to secure the trailer to the truck.

2. The method of claim 1 wherein the hitch insert assembly has a hitch insert that is secured to a hitch attachment of the trailer.

3. The method of claim 2 wherein the mounting plate assembly is disposed within a bed of the truck and having a hitch guide that has the angled surface that is engaged by the hitch insert assembly.

4. The method of claim 3 wherein the hitch guide has a frustoconical shape.

5. The method of claim 3 wherein the hitch insert has a hitch mount that engages the angled surface of the hitch guide.

6. The method of claim 5 where the hitch mount is a ball mount.

7. The method of claim 5 wherein the hitch guide has an opening disposed therethrough and the hitch mount is disposed through the opening when the first coupling device is in the hitch housing.

8. A trailer hitch and mounting system comprising:

a hitch insert assembly attached to a hitch attachment of a trailer and having a hitch mount;

a mounting plate assembly having a mounting plate secured within a bed of a truck; and wherein the mounting plate assembly has a hitch guide with an angled surface that receives and is engaged by the hitch mount to guide the hitch mount toward an opening in the hitch guide;

wherein a hitch housing is disposed within the opening to receive the hitch mount.

9. The system of claim 8 wherein the mounting system has first and second mounting rails that are mounted to the bed of the truck.

10. The system of claim 8 wherein the hitch guide has a frustoconical shape.

11. The system of claim 8 wherein the mounting plate assembly has a locking pin assembly that extends laterally into an upper portion of the hitch housing.

12. The system of claim 11 wherein the locking pin assembly has a locking pin that engages a tapered surface or recess of the hitch mount.

13. The system of claim 11 wherein the pin assembly has a handle that extends outwardly to the exterior of the bed of the truck.

* * * * *